INVENTOR.
ALTON L. CAVINESS

United States Patent Office 3,484,204
Patented Dec. 16, 1969

3,484,204
REACTOR FOR MIXING VISCOUS LIQUIDS
Alton L. Caviness, Durham, N.C., assignor to Monsanto Company, St. Louis Mo., a corporation of Delaware
Filed Apr. 27, 1966, Ser. No. 545,660
Int. Cl. B01f 3/10; B011 3/00
U.S. Cl. 23—252                                     5 Claims

ABSTRACT OF THE DISCLOSURE

A reactor which employs a plunger-type agitator which is actuated by an inert medium remotely controlled and particularly adapted for reacting highly viscous liquids under inert conditions in very small quantities.

---

Figures 1, 2:
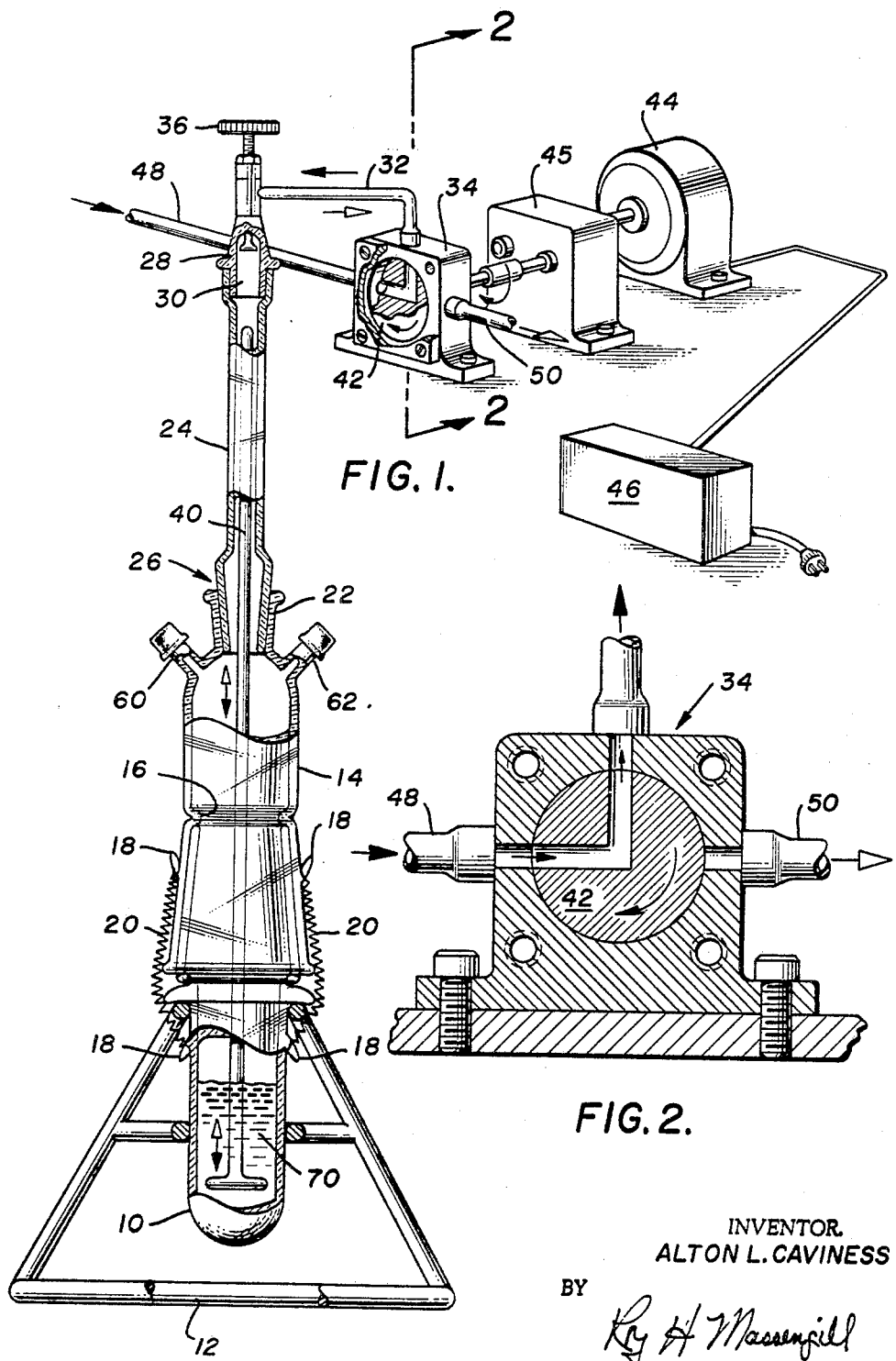

The present invention relates to a reactor for mixing viscous liquids under inert conditions, and more particularly to a reactor having a plunger-type agitator for reacting highly viscous liquids under inert conditions in very small quantities. This invention has particular application in reacting viscous liquids under inert conditions as in the bulk-type reaction between a polyester diol and an aromatic diisocyanate.

In the preparation of synthetic fibers such as spandex, it is very essential that extremely careful and explicit procedures be followed in order to obtain a useful product. The reactants employed to prepare the necessary polymers for making spandex fibers are quite sensitive to moisture and are highly viscous even at elevated temperatures. These reactants will undergo side reactions readily if contaminated in any way. Therefore, every possible precaution must be undertaken to insure that no moisture comes into contact with the reactants and further that viscous reactants are thoroughly mixed to obtain a completed reaction. To study the fundamental chemical reactions involved, and to minimize all undesirable side reactions, a special type of apparatus is required which will permit charging of the reactor, adding reactants and withdrawing samples for analysis without exposure to the atmosphere, and means for stirring the very thick reaction mixtures.

It is therefore an object of the present invention to provide apparatus for carrying out reactions involving highly viscous liquids and reactants that are especially sensitive to atmospheric moisture.

Another object of the present invention is to provide apparatus having a plunger-type agitator which is actuated by an inert fluid from a source in a remote location.

Still another object of the present invention is to provide laboratory apparatus for preparing spandex polymers.

Yet another object of the present invention is to provide a laboratory reactor which employs a plunger-type agitator reciprocated by an inert medium controlled by means which can be isolated from the reactor.

Other objects and advantages of this invention will be apparent from the description to follow.

For the purpose of illustrating the invention there is shown in the drawings a preferred embodiment. It will be understood however that this invention is not limited to the precise arrangements and mechanical details which are shown.

The various features and details of the construction and operation of the invention are more fully set forth hereinafter with reference to the accompanying drawing in which:

FIGURE 1 is a perspective view of the apparatus depicting an operative arrangement with portions thereof broken away to show particular details of the invention presently preferred, and FIGURE 2 is a cross-section of the 3-way control valve which illustrates the internal parts thereof.

Referring to the drawings, there is shown a reactor vessel 10 suspended in a vertical position by a support 12. The vessel 10 is preferably made from glass and has a generally cylindrical configuration of uniform cross-section throughout its entire height. The upper section of the vessel is provided with an annular male joint tapered slightly for telescopic engagement with an opposed cylindrical member 14. The member 14 is tapered at one end to accommodate the tapered portion of vessel 10. The diameter of member 14 is reduced at the end of the taper to provide an internal ridge 16 which restricts the engagement depth of vessel 10. The engaging portions of vessel 10 and the member 14 are dimensioned to fit snuggly to provide a sealing engagement between the two members. Each of the members are provided with oppositely inclined lobes 18 to retain a spring 20 on each side of the sealed joint to maintain the members 10 and 14 together in a sealed relationship. Member 14 has a tapered opening 22 at the top for receiving a tubular member 24. The engaging portions are adapted to fit snuggly and thereby provide a sealed joint 26 when the portions are fully engaged.

The tubular member 24 is capped with a resilient stopper 28 having a passageway 30. A flexible tube 32 is connected to the stopper 28 and a 3-way stopcock 34 for communication between the stopcock and passageway 30. A screw-type adjustable fitting 36 is mounted on the top of stopper 28 for adjusting the stroke of a stirring rod 40. The disc 42 of stopcock 34 is driven by a motor 44 powered by the source 46. The rotating speed of disc 42 is controlled through a variable speed changer 45. In order to actuate the plunger 40 an inlet 48 for receiving an inert gas from a source not shown is connected to the stopcock 34 and outlet 50 is provided on the opposite side of said stopcock for evacuating the system.

In operation the vessel 10 is assembled as shown in FIGURE 1. The system is flushed with an inert gas such as nitrogen to remove all atmospheric moisture by introducing the gas through either of the ports 60 and 62. After the system has been purged, the reactor vessel 10 can be charged with reactants through the other port without exposing the reactants to the atmosphere. The vessel should be pressurized slightly with the inert gas during any reaction which is carried out under varying temperatures to protect the system from becoming contaminated with outside air. Stirring of the reactants can be accomplished by alternately imposing a positive and negative pressure on the top portion of the plunger-type stirring rod 40. This is accomplished by introducing an inert fluid medium, preferably nitrogen gas, into the tube 32 from inlet 48 when the ports of the stopcock are in registry with these passages as shown in FIGURE 2. The pressurized nitrogen gas forces the stirrer 40 downwardly since the stirrer shaft is essentially contiguous with the bearing walls of the tubular member 24 to effectively restrict the passage thereof. To achieve the reciprocating action necessary or producing the mixing required, the registry of the stopcock is changed by rotating the disc from communication between the tube 32 and the exhaust outlet 50 which evacuates the system to lift the stirrer 40 against the stop means 36. The stop means is adjustable to limit the travel of the stirrer rod which is determined by the level of the reactants 70. Similarly the reciprocating action of the stirrer can be controlled by the speed at which the stopcock disc 42 is rotated.

The ports 60 and 62 are sealed with resilient caps such as serum caps which allow the flushing and charging of the reactor vessel and the subsequent addition of reactants and removal of samples for analysis with hypodermic needles or the like without exposing the vessel or its contents to the atmosphere. To facilitate better mixing the plunger-type agitator 40 is provided with a flat end portion which is designed to obtain the desired amount of mixing action. This type of agitator is preferred for mixing highly viscous liquids.

As an example, the apparatus described herein was used for carrying out reactions between a polyester containing urethane groups and isocyanate groups. This reaction is very sensitive to moisture and precautions must be taken at all times to insure the reaction takes place without contact with the atmosphere in order to prevent undesirable side reactions from occurring. The reactor system was purged with nitrogen gas and the vessel was then charged with the liquid along with phenylisocyanate through the serum capped port using a hypodermic needle. The reactor was heated to 120° C. in an oil bath and the reaction was carried out for 2 hours with stirring continuing throughout the reaction period. Samples were taken at intervals for analysis by nuclear magnetic resonance. The analysis showed that no urea groups were formed, thus indicating no moisture had entered into the reactor during the addition of reactants and sampling.

While particular embodiments of the present invention have been herein illustrated and described, it is not intended to limit the invention to such disclosures, but changes and modifications may be made thereto within the scope of the following claims.

What is claimed is:

1. Apparatus for mixing highly viscous materials which comprises:
    (a) a reactor vessel provided with sealable access ports,
    (b) a hollow elongate member telescopically engaging a portion of the reactor vessel to produce a gas-tight seal,
    (c) a hollow imperforate cap mounted in the top portion of said elongate member,
    (d) a stirring rod disposed in said vessel, and
    (e) a rotatable 2-way plug and plug drive means, connected to said hollow imperforate cap, which alternately communicates with a pressurized source and a negative pressure source upon rotation thereof to reciprocate the stirring rod.

2. The apparatus of claim 1 in which the drive means is isolated from the reactor vessel.

3. The apparatus of claim 1 in which means are provided for varying the stroke of the stirring rod and the reciprocating rate thereof.

4. The apparatus of claim 1 in which the walls of the hollow elongate member serves as bearing surfaces that guide the stirring rod which is contiguous therewith.

5. The apparatus of claim 1 in which the lower end portion of the stirring rod is substantially larger in diameter than the rod itself.

References Cited

UNITED STATES PATENTS 2,301,204  11/1942  Fields et al. _____ 23—285 XR

JAMES H. TAYMAN, Jr., Primary Examiner

U.S. Cl. X.R.

23—259, 285, 292; 103—235; 259—27, 98, 113, 141; 260—77.5, 95; 261—81, 82